United States Patent [19]

Strepparola et al.

[11] Patent Number: 4,818,619
[45] Date of Patent: Apr. 4, 1989

[54] FORMED ARTICLES OF FLUORINATED POLYMERS CONTAINING FILLERS AND HAVING IMPROVED PROPERTIES

[75] Inventors: Ezio Strepparola, Bergamo; Tiziano Terenghi; Enrico Monza, both of Milan; Fabio Felippone, Monza, all of Italy

[73] Assignee: Ausimont S.p.A., Milan, Italy

[21] Appl. No.: 943,079

[22] Filed: Dec. 18, 1986

[30] Foreign Application Priority Data

Dec. 23, 1985 [IT] Italy ............................ 23374 A/85

[51] Int. Cl.$^4$ .................. B32B 27/00; C08K 7/12; C08K 7/14
[52] U.S. Cl. ........................... 428/421; 428/422; 428/447; 524/442; 524/455
[58] Field of Search ............ 428/391, 422, 421, 451, 428/474.4, 409, 410, 323, 325, 327; 528/70, 44; 526/246; 524/455, 442

[56] References Cited

U.S. PATENT DOCUMENTS

| | | | |
|---|---|---|---|
| 3,787,281 | 1/1974 | Effenberger | 428/39 X |
| 3,810,874 | 5/1974 | Mitsch et al. | 528/44 X |
| 3,814,741 | 6/1974 | Caporiccio et al. | 526/246 |
| 4,157,358 | 6/1979 | Field et al. | 528/70 X |

*Primary Examiner*—Thomas J. Herbert
*Attorney, Agent, or Firm*—Stevens, Davis, Miller & Mosher

[57] ABSTRACT

Fluorinated polymers having improved mechanical properties and an improved surface appearance, characterized in that they comprise a reinforcing material based on glass, asbestos and silicates in general or carbon, in the form of fibres or granules, or polyamidic fibres, such material being superficially treated with fluoropolyethers having an average molecular weight from 1,000 to 10,000 and containing functional end groups capable of forming bonds of various nature with the reinforcing material.

5 Claims, No Drawings

FORMED ARTICLES OF FLUORINATED POLYMERS CONTAINING FILLERS AND HAVING IMPROVED PROPERTIES

BACKGROUND OF THE INVENTION

1. Field of the invention.

The present invention relates to fluorinated polymers or copolymers in the form of formed articles having improved mechanical and surface properties. The polymers according to the invention contain a reinforcing filler based on glass, asbestos, silicates in general, carbon, aromatic polyamides, in the form of powders or fibres.

Said reinforcing fillers are pretreated with fluoropolyethers having functional end groups, which impart improved mechanical properties and improved surface characteristics as compared with the reinforcing fillers known in the art.

The fillers treated according to the present invention remain perfectly dispersed in the polymer, whereby preventing, during the mechanical treatments, the separation thereof in heterogeneous areas which would impair the mechanical and surface properties.

2. The Prior art.

As is well known, in order to improve the mechanical and surface characteristics of the fluorinated polymers, these are reinforced with fillers, in particular glass fibres treated with organic compounds with a view to increasing the compatibility of such fibres with polymers such as, for example, polytetrafluoroethylene.

According to U.S. Pat. No. 3,787,281, the glass fibre treatment is carried out by means of a hydrolizable nonfluorinated siloxane compound containing an aminic end group.

According to GB Pat. No. 1,250,798, both siloxane compounds and alkoxy-titanium compounds are utilized for the surface treatment of reinforcing materials such as glass fibres or metal powders. The compounds utilized for said treatment do not contain fluorine; examples thereof are in particular Ti-tetrabutylate, 3-aminopropyl-triethoxy-silane and phenylmethyl-polysiloxane.

The articles obtained from the polymers which have been reinforced according to the conventional methods are not always satisfactory as regards a perfect homogenization of the reinforcing material with the polymer; such non-homogeneity results in an irregular surface appearance and in a grey shade as well as in a rather low mechanical strength, in particular as concerns the flex-life on treated fabrics.

THE PRESENT INVENTION

It has now surprisingly been found that it is possible to obtain fluorinated polymers containing reinforcing materials which are perfectly homogenized in the polymeric mass and exhibit a high adhesion to the same. Furthermore, the appearance of the manufactured articles is improved due to the absence of any grey shade and to the surface regularity and homogeneity.

The reinforced polymeric materials of the invention are prepared by incorporating into tetrafluoroethylene polymers or copolymers a reinforcing material based on glass, asbestos and silicates in general, or carbon, in the form of fibres or granules, or a material consisting of aromatic polyamidic fibres, such reinforcing material being previously treated on its surface with fluoropolyethereal compounds acting as a bonding agent.

Such compounds comprise sequences of one or more fluorooxyalkylene units selected from the following classes:

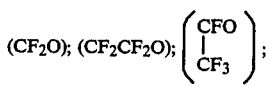

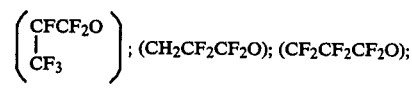

said sequences can be linked to one another by divalent perfluoro alkylene groups, or also by divalent non-fluorinated radicals, and they exhibit, at one or both ends, functional groups suited to form chemical or physical bonds of different nature with the reinforcing material.

Such functional groups are selected from:
a. siloxane groups;
b. alkoxy-titanic groups;
c. epoxy group

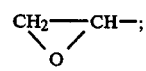

d. acrylic group $CH_2=CH-COO-$; or methacrylic group

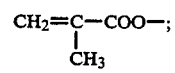

e. isocyanic group;
f. aromatic radicals, either or not containing heteroatoms capable of giving rise to coordination or charge-transfer bonds.

The functional groups from a. to e. are linked to the fluoropolyethereal chain by divalent linking groups particularly comprising one or more of the following groups:

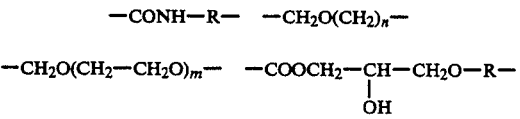

where n is an integer from 0 to 6, m is an integer from 0 to 3, and R is an alkylene radical containing 1 to 6 carbon atoms or an arylene radical containing 6 to 10 carbon atoms, while the functional groups of class f. are linked to the fluoropolyethereal chain by means of divalent linking groups comprising in particular:

$-CH_2O-$;

$-CH_2-O-CH_2$;

$-CF_2-$;

$-CF_2O-$.

The functional end groups belonging to class a. are represented by the following formula:

—Si(OR)AA' where R is an alkyl radical containing 1 to 5 carbon atoms, or an aryl radical containing 6 to 10 carbon atoms or an arylalkyl or alkylaryl radical containing 7 to 10 carbon atoms, and A and A', like or different from each other, are —R or —OR.

The functional end groups belonging to class b. are represented by the following formula:

—Ti(OR)$_3$, where R is the same as defined hereinbefore, the three —OR being equal or different from one another.

The end groups belonging to class f. are aromatic radicals comprising at least an aromatic ring, having 5 to 6 atoms containing or not heteroatoms, and comprising one or more rings condensed with such aromatic ring, some of such rings being optionally cycloaliphatic rings. Said aromatic radicals may optionally contain alkyl groups $C_1$–$C_3$ and/or alkoxy groups $C_1$–$C_3$ and/or halogen atoms as substituents.

Among the end groups belonging to class f. one may cite e.g. those described in Italian patent application 21480 A/84 in the name of the Applicant hereof; the preferred groups being in particular

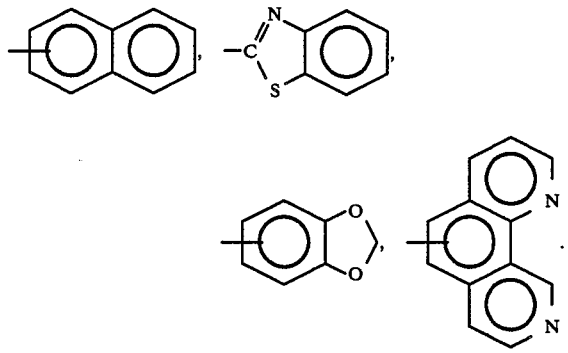

Fluoropolyethereal compounds utilizable in the present invention are those having an average molecular weight from 1,000 to 10,000, preferably from 1,500 to 4,000. They are prepared by grafting, according to conventional methods, the above-indicated functional end groups on known fluoropolyethers having reactive groups at one or both ends.

If there is only one functional end group of the above-said type, the other end of the fluoropolyether will generally consist of a neutral end group of the type which is known for the starting fluoropolyethers, in particular a perfluoroalkyl group $C_1$–$C_3$.

The compounds having siloxane or alkoxytitanium end groups are used in particular when the reinforcing filler is based on glass, asbestos or silicates in general, while when the filler is based on carbon it is preferable to use compounds with functional groups of classes f. and c.

The fluoropolyether compounds useful in the present invention are preparable through the methods and processes disclosed in U.S. Pat. Nos. 3,242,218, 3,665,041, 3,715,378, 3,810,874, 3,814,741, 3,847,978, 4,523,039, EP Pat. No. 148,482, EP Pat. No. 151,877, GB Pat. No. 1,244,189 and Italian application No. 22902 A/85 of the Applicant.

The treatment of the reinforcing material with the fluoropolyether compound can be carried out by contacting said material with a solution of the fluoropolyether compound: the solvent is then evaporated preferably by heating the material.

The fluorinated polymers forming the object of the present invention are the homopolymers of $C_2F_4$ or the copolymers of same with minor amounts of perfluoropropene and/or of a perfluoroalkylperfluorovinyl ether of type $R_f$—O—CF=CF$_2$ where $R_f$ is a perfluoroalkyl radical containing 1–3 carbon atoms. Commercially known are $C_2F_4/C_3F_6$ copolymers containing up to 15 mol-% of $C_3F_6$, $C_2F_4/R_f$—O—CF=CF$_2$ copolymers containing up to 7 mol-% of perfluoroalkylperfluorovinyl ether and terpolymers in which the two above-said comonomers are present in amounts up to 12% by weight and up to 3% by weight, respectively.

A further object of the invention is that fabrics based on fibres of glass, of asbestos, of carbon, of aromatic polyamides, after treatment with the functionalized fluoropolyethers as described above, are impregnated with aqueous dispersions of fluorinated polymers or copolymers, thereby leading, after proper heat-treatments, to articles having improved mechanical characteristics, in particular an improved flex-life resistance.

The following examples are given merely to illustrate the invention and are not a limitation of any possible embodiments thereof.

EXAMPLE 1

Non-dressed glass fibres E (see Kirk-Othmer, Encyclopedia of Chemical Technology, vol. 6, pages 692–694, 3rd ed.), having length of 5–25 mm and an average diameter of 12 microns, were caused to macerate at room temperature during 20 hours in a solution consisting of 80% by volume of Freon ® 113, 18% by vol. of ethanol and 2% by vol. of H$_2$O, additioned with compound (I):

[O—(C$_2$F$_4$O)$_{10}$(CF$_2$O)$_{10}$][CF$_2$—CO—NHC$_3$H$_6$Si(OCH$_3$)$_3$]$_2$ in an amount equal to 0.15% by weight referred to the treated fibres. The fibres were dried for 2 hours at 60° C. at reduced pressure.

30 parts by weight of the fibres so treated were mixed with 70 parts by weight of C$_2$F$_4$/C$_3$F$_6$ copolymer (FEP) containing 12 mol % of C$_3$F$_6$ and having a Melt flow index equal to 32 (determined according to ASTM D 238 at 372° C. and with a 5 kg load). Such mixture was charged to the hopper of a single-screw extruder equipped with an outlet nozzle of 3 mm diameter. The temperature in the feed area was of 300° C., in the middle area of 340° C. and in the head of 350° C.

The extrudate was granulated and made to pass again through the extruder under the same conditions in order to obtain an oriented-fibre extrudate.

The strands were placed parallel with one another into a mold of 10 cm side and 1 mm thickness, in order to maintain the glass fibre orientation generated during the extrusion.

By compression molding at 350° C. there were obtained small plates, wherefrom, by means of punching, test pieces for tensile tests according to ASTM D 638 were prepared; the punching and traction directions were corresponding to the orientation of the glass fibres in the material.

The tensile stress, measured at 23° C. and at a stretching rate of 5 cm/min., was equal to 480 kg/cm², which was corresponding to an improvement of about 250% with respect to the polymer as such, of 70% with respect to the polymer reinforced with non-dressed glass fibres, and of 30% with respect to the polymer reinforced with glass fibres treated with compound $$NH_2C_3H_6Si(OC_2H_5)_3 \qquad (II).$$

EXAMPLE 2

3 mm long carbon fibres having an average diameter of 7 microns were wetted with a solution comprising 80% by volume of Freon® 113, 20% by volume of ethanol and containing 0.15% by wt., referred to the carbon fibres, of compound:

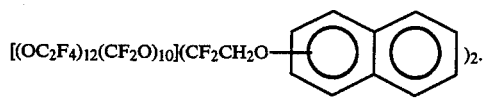
(III)

having an average molecular weight equal to about 2400.

The wet fibres were left at room temperature during 20 hours, whereafter the solvent was evaporated for 2 hours at 60° C. and at reduced pressure.

The fibres (15 parts by weight) were mixed with 85 parts by weight of FEP; extrusion, molding and characterization were then carried out as is described in example 1.

This product exhibited a tensile strenght equal to 620 kg/cm², which was corresponding to an improvement of 380% with respect to the polymer as such and of 20% with respect to the polymer reinforced with non-dressed carbon fibres.

EXAMPLE 3

A fluorinated epoxy polymer (IV) was prepared according to the following modalities.

In a three-neck flask there were dissolved 22.4 g of potassium terbutylate in 250 cc of ter.butyl alcohol maintained at 35° C. by means of an external heating bath. In 5 minutes there were added 200 g of α,ω-bis-(hydroxymethyl)-polyoxyperfluoroalkylene of type Fomblin Z®, prepared accoring to U.S. Pat. No. 3,810,874, having a molecular weight of 2,000 (0.1 mols), and it was stirred at 35° C. for an hour.

27.8 g of epichlorohydrin were then added; the whole was heated to 70° C. and this temperature was maintained for 4 hours.

After this time, the crude was poured into 700 cc of distilled water at 25° C. under stirring. It was allowed to rest, whereafter the heavier phase was separated, which was dissolved in a solution of DELIFRENE LS® and acetone (80/20), anhydrified with $Na_2SO_4$ and filtered.

Obtained was a fluorinated polymer (57.7% of F; 0.6% of H) having an epoxy equivalent weight equal to 2560.

The impregnation of a carbon fibre fabric weighing 200 g/m², with 5 threads/cm for both the weft and the warp and with 3,000 filaments per thread, was accomplished by immerging the cloth into a DELIFRENE LS® solution containing 10% by weight of the epoxy polymer IV prepared as described above, 2.2 moles of diethylene triamine and 0.001 moles of DABCO® (diazadicyclooctane).

The cloth was then dried for 2 hours at 60° C., whereafter a further crosslinking treatment at 80° C. was carried out for 2 hours.

The product resulted to be impregnated with the epoxy compound IV for 9.8% by weight.

The carbon fibre fabric, after having been subjected to said treatment, was immersed into an aqueous dispersion containing 40% by weight of PTFE and then dried.

Water was evaporated at 100° C. and the cloth was dried for 5 minutes at 200° C. and then it was brought to room temperature.

The impregnation cycle was repeated, following by drying and heating to 200° C., for further three times, but using for the impregnation an aqueous dispersion of PTFE at 60% by weight.

Obtained was a fabric coated with 50% by weight of PTFE, which was sintered at 400° C. for 7 minutes.

The resulting product was perfectly smooth and free from exposed fibres.

From the impregnated fabric so obtained, test pieces of 15 mm width and 15 cm length were cut.

These fabric stripes were subjected to a prefixed number of bendings, according to the method described in standard ASTM 2176/69, and the tensile strength of the test pieces so treated was measured and compared with the one of test pieces not subjected to bending.

The resistance to flexure is reported as percentage of tensile strength retained after flexure.

For the carbon fibre fabric treated with compound IV as described above, the tensile strength at 23° C. and at a stretching rate of 10 mm/min. measured on test pieces after 50 bendings, is equal to 82 kg/cm, which corresponds to 93% of the tensile strength of the non-bended fabric.

As a comparison, for a carbon fibre fabric not pre-treated with compound IV and treated with the same PTFE dispersion in order to obtain the same percentage of PTFE impregnation, the tensile strength measured on test pieces subjected to 50 flexures is equal to 10 kg/cm, which corresponds to 11% of the tensile strength of the non-bended cloth.

What is claimed is:

1. Formed articles consisting essentially of fluorinated polymers having improved mechanical properties and an improved surface appearance, comprising a reinforcing material dispersed in the fluorinated polymer and based on glass, asbestos and silicates in general or carbon in the form of fibers or granules or aromatic polyamidic fibers, said reinforcing material, before being dispersed in the fluorinated polymer, having been superficially pre-treated with a bonding agent consisting essentially of fluoropolyethers having an average molecular weight from 1,000 to 10,000 and containing functional end groups adapted to form bonds with the reinforcing material, said functional groups being selected from the following classes:

(a) siloxane groups having the formula:

—Si(OR)AA' where R is an alkyl radical containing from 1 to 5 carbon atoms, or an aryl radical containing from 6 to 10 carbon atoms, or an arylalkyl or alkylaryl radical containing from 7 to 10 carbon atoms, and A and A', like or different from each other, are —R or —OR;

(b) alkoxy-titanic groups;
(c) the epoxy group:

$$CH_2\!\!-\!\!\!\!\underset{O}{\underset{\diagdown\;\diagup}{}}\!\!\!\!-CH-$$

(d) the acrylic group: $CH_2\!=\!CH\!-\!COO\!-$; or the methacrylic group:

$$CH_2\!=\!\underset{\underset{CH_3}{|}}{C}\!-\!COO-$$

(e) isocyanic groups; and
(f) an aromatic radical, either containing or not containing hetero-atoms, as follows:

2. The fluorinated polymers of claim 1, wherein the linking groups for the functional groups from a. to e. are selected from:

$-CONH-R-$; $-CH_2O(CH_2)_n-$;

$-CH_2O(CH_2-CH_2O)_m-$; $-COOCH_2-\underset{\underset{OH}{|}}{CH}-CH_2O-R-$;

wherein n is an integer from 0 to 6, m is an integer from 0 to 3 and R is an alkylene radical containing from 1 to 6 carbon atoms or an arylene radical containing from 6 to 10 carbon atoms, while the functional groups of class f. are linked to the fluoropolyethereal chain by means of divalent linking groups selected from:

$-CH_2O-$;

$-CH_2O-CH_2-$;

$-CF_2-$;

$-CF_2O-$.

3. The fluorinated polymers of claim 1, wherein the fluoropolyethereal compound comprises sequences of one or more fluorooxyalkylene units selected from the following classes:

$-CF_2O-$; $-CF_2CF_2O-$;

$$-\!\!\left(\!\!\underset{\underset{CF_3}{|}}{CFO}\!\!\right)\!\!-; \quad -\!\!\left(\!\!\underset{\underset{CF_3}{|}}{CF}\!\!-\!CF_2O\!\!\right)\!\!-;$$

$-CH_2CF_2CF_2O-$; $-CF_2CF_2CF_2O-$;

said sequences being linkable to one another by divalent fluorinated or non-fluorinated groups.

4. The fluorinated polymers of claim 1, wherein the functional end groups belonging to class b. are represented by the following formula:

$-Ti(OR)_3$ wherein the three $-OR$ groups are equal or different from each other and wherein R is an alkyl radical containing from 1 to 5 carbon atoms, or an aryl radical containing from 6 to 10 carbon atoms or an acrylalkyl or alkylaryl radical containng from 7 to 10 carbon atoms.

5. The fluorinated polymers of claim 1, consisting of homopolymers of $C_2F_4$ or of copolymers of $C_2F_4$ with minor amounts of perfluoropropene and/or perfluoroalkyl-perfluorovinylethers.

* * * * *